US005722084A

United States Patent [19]
Chakrin et al.

[11] Patent Number: 5,722,084
[45] Date of Patent: Feb. 24, 1998

[54] CELLULAR/PCS HANDSET NAM DOWNLOAD CAPABILITY USING A WIDE-AREA PAGING SYSTEM

[75] Inventors: Lewis Mark Chakrin, Mendham; Irwin Gerszberg, Kendall Park; Robert Edward Schroeder, Morris Township, Morris County; Dale Eugene Stone, Hanover Township, Morris County, all of N.J.

[73] Assignee: AT&T Corp., Middletown, N.J.

[21] Appl. No.: 700,135

[22] Filed: Aug. 20, 1996

Related U.S. Application Data

[63] Continuation of Ser. No. 344,394, Nov. 23, 1994, abandoned, which is a continuation of Ser. No. 78,133, Jun. 17, 1993, abandoned, and a continuation-in-part of Ser. No. 85,248, Jun. 30, 1993, Pat. No. 5,297,192, which is a continuation-in-part of Ser. No. 914,011, Jul. 15, 1992, abandoned, which is a continuation of Ser. No. 590,411, Sep. 28, 1990, abandoned, and a continuation-in-part of Ser. No. 72,647, Jun. 3, 1993, Pat. No. 5,297,191, which is a continuation-in-part of Ser. No. 914,214, Jul. 15, 1992, abandoned, which is a continuation of Ser. No. 590,409, Sep. 28, 1990, abandoned.

[51] Int. Cl.$^6$ .................................................. H04Q 7/00
[52] U.S. Cl. ...................... 455/551; 455/419; 455/420; 455/426; 455/556
[58] Field of Search ........................ 455/88, 89, 186.1, 455/33.1, 33.3, 33.4, 550, 551, 552, 556, 557, 575, 403, 418, 419, 420, 422, 426; 379/57, 58, 59, 62, 63

[56] References Cited

U.S. PATENT DOCUMENTS

| | | | |
|---|---|---|---|
| 4,747,122 | 5/1988 | Bhagat et al. | 379/57 |
| 4,817,190 | 3/1989 | Comroe et al. | 379/63 |
| 4,864,599 | 9/1989 | Saegusa et al. | 379/58 |
| 5,077,790 | 12/1991 | D'Amico et al. | 379/62 |
| 5,117,449 | 5/1992 | Metroka et al. | 379/58 |
| 5,148,473 | 9/1992 | Freeland et al. | 379/58 |
| 5,237,612 | 8/1993 | Raith | 455/33.1 |
| 5,276,729 | 1/1994 | Higuchi et al. | 379/58 |
| 5,297,191 | 3/1994 | Gerszberg | 379/59 |
| 5,297,192 | 3/1994 | Gerszberg | 379/59 |
| 5,301,223 | 4/1994 | Amadon et al. | 379/58 |

FOREIGN PATENT DOCUMENTS

| | | |
|---|---|---|
| 63-224422 | 9/1988 | Japan ................ 379/58 |
| 2 249 459 | 7/1991 | United Kingdom . |

OTHER PUBLICATIONS

Gerszberg 9 (formerly Gerszberg 5, continuation of Gerszberg 1) with Amendments. Serial #08/072,647. Filed Jun. 3, 1993.

Gerszberg 11 (formerly Gerszberg 6, continuation of Gerszberg 2) with Amendments. Serial No. 08/085,248. Filed Jun. 30, 1993.

*Primary Examiner*—Reinhard J. Eisenzopf
*Assistant Examiner*—Doris To

[57] ABSTRACT

The invention relates to a personal communicator which includes an electromagnetic antenna for receiving signals from a wide-area paging system coupled to a receiver for receiving a number assignment module from the antenna. The receiver delivers the number assignment module to a controller which programs the number assignment module into a memory element. The number assignment module is stored in the memory element. The controller retrieves the number assignment module from the memory element for use in communication with a cellsite which forms a part of a cellular communications system. Advantageously, the present invention permits remote programming of a personal communicator by a cellular service provider, eliminating the need for an authorized agent to manually program the personal communicator.

12 Claims, 4 Drawing Sheets

CELLULAR/PCS HANDSET NAM DOWNLOAD CAPABILITY USING A WIDE-AREA PAGING SYSTEM

This application is a continuation of application Ser. No. 08/344,394, filed on Nov. 23, 1994, now abandoned, which was: (1) a continuation of application Ser. No., 08/078,133, filed on Jun. 17, 1993, now abandoned; and (2) a continuation-in-part of application Ser. No. 08/085,248, filed Jun. 30, 1993, which issued as U.S. Pat. No. 5,297,192 on Mar. 22, 1994, and which was itself a continuation-in-part of application Ser. No. 07/914,011. filed Jul. 15, 1992, abandoned, which was a continuation of application Ser. No. 07/590,411, filed Sep. 28, 1990, abandoned; and (3) a continuation-in-part of application Ser. No. 08/072,647, filed Jun. 3, 1993, which issued as U.S. Pat. No. 5,297,191 on Mar. 22, 1994, and which was itself a continuation-in-part of application Ser. No. 07/914,214, filed Jul. 15, 1992, abandoned, which was a continuation of application Ser. No. 07/590,409, filed Sep. 28, 1990, abandoned.

FIELD OF THE INVENTION

The present invention relates to cellular telephony in general, and more particularly, to cellular telephones that incorporate a paging capability that enables the telephones to be remotely programmed via a wide-area paging system.

BACKGROUND OF THE INVENTION

Purchasers of personal communicators (e.g., cellular telephones) are usually inconvenienced by the effort required to program the personal communicator before it can be used. In general, a personal communicator can only be programmed by an authorized agent of a cellular service provider and usually only at the agent's location. Thus, the potential subscriber is often inconvenienced by the delay between the purchase and use of the phone, and by the additional costs associated with having the agent program the phone.

SUMMARY OF THE INVENTION

Embodiments of the present invention are capable of programming a personal communicator (e.g., a cellular telephone) while avoiding many of the costs and restrictions associated with prior techniques. Embodiments of the present invention are particularly useful for those who acquire a personal communicator and are not near an authorized agent of a cellular service provider. Furthermore, embodiments are useful for those who wish to change their service without having to incur the inconvenience and cost associated with surrendering possession of the personal communicator.

These results are obtained in an illustrative embodiment that comprises an antenna, means for receiving a number assignment module via said antenna, and means for storing said number assignment module.

DETAILED DESCRIPTION

Figure 1:
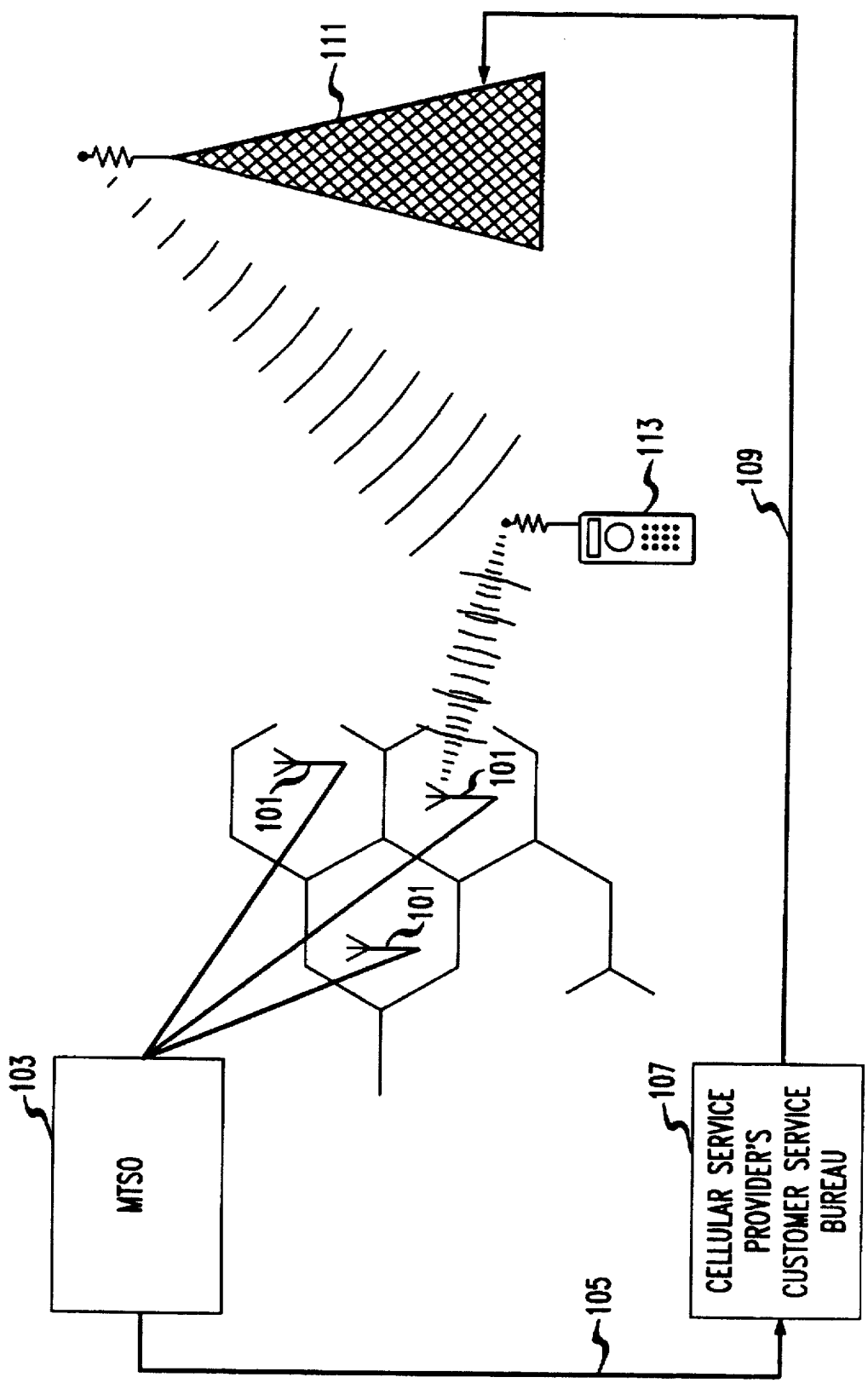
FIG. 1 shows a schematic diagram of an illustrative embodiment of the present invention.

FIG. 1 shows a schematic diagram of an illustrative embodiment of the present invention. The illustrative embodiment advantageously comprises cellsites 101, mobile telephone switching office 103 (hereinafter "MTSO 103"), connection 105, cellular service provider's customer service bureau 107 (hereinafter "service bureau 107"), connection 109, antenna 111, and personal communicator 113. For the purposes of this specification, the term "personal communicator" includes, but is not limited to, cordless phones, cellular phones, wireless video phones, cellular modems, and mobile computing devices.

Cellsites 101 advantageously comprise the radio and control equipment necessary to establish and maintain the talking path to personal communicator 113. Cellsites 101 are preferably capable of relaying signals to and from MTSO 103 and personal communicator 113.

MTSO 103 is advantageously a central office for cellsites 101 and houses the control and switching elements of the cellular system. MTSO 103 is capable of relaying information between other cellsites (not shown), other personal communicators (not shown), and other MTSOs (not shown).

Connection 105 advantageously comprises a communication link (either wireline or wireless) between MTSO 103 and service bureau 107. Connection 109 advantageously comprises a communication link (either wireline or wireless) between MTSO 103 and antenna 111.

Service bureau 107 advantageously comprises a facility populated by the cellular service provider. Service bureau 107 advantageously receives and stores credit information from the potential subscriber pertaining to the potential subscriber's account. Service bureau 107 advantageously also creates and transmits a "number assignment module" to personal communicator 113 via antenna 111. For the purpose of this specification, the phrase "number assignment module" may include, but is not limited to, signals representing the personal communicator's telephone number, one or more system identification numbers, the access overload class, the group identification, the initial paging channel, the security lock code, the local use flag, the A/B system selection, and the min mark flag.

Antenna 111 advantageously comprises a electro-magnetic antenna and a wide area paging system, which is capable of transmitting the signals representing the number assignment module to personal communicator 113. For the purpose of this specification, the term "electro-magnetic" includes, but is not limited to, the electro-magnetic spectrum including radio frequency and optical bands.

Personal communicator 113 advantageously comprises means for wireless transmission and reception, with cellsites 101 and antenna 111, of radio signals via one or more electro-magnetic antennas. Personal communicator 113 includes means for storing a number assignment module, as received from service bureau 107 for the purpose of authentication.

Figure 2:
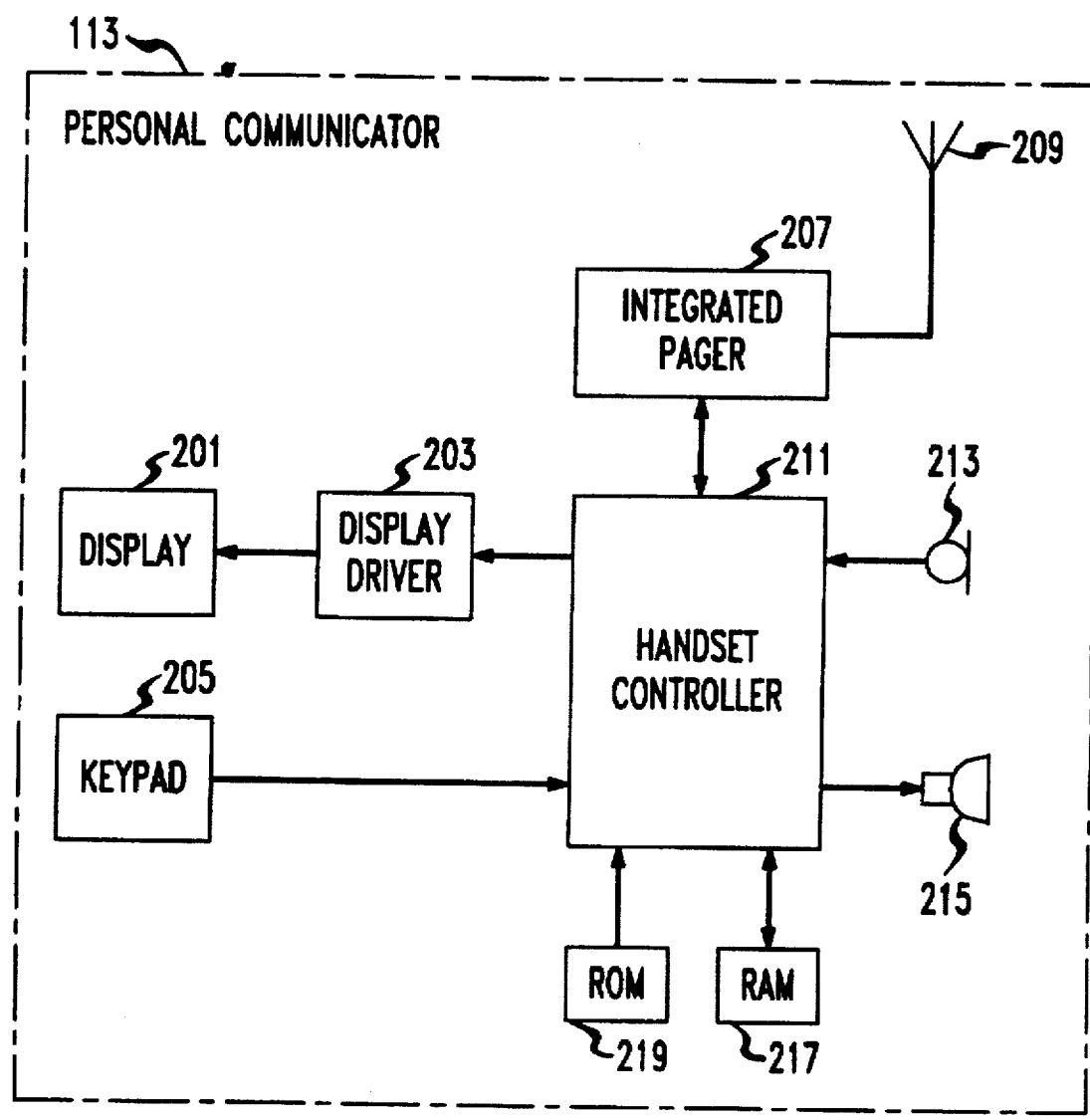
FIG. 2 shows a block diagram of an illustrative personal communicator of the present invention.

FIG. 2 shows a block diagram of personal communicator 113 as shown in FIG. 1. The illustrative personal communicator advantageously comprises display 201, display driver 203, keypad 205, handset controller 211, integrated pager 207, antenna 209, microphone 213, speaker 215, ROM 219, and RAM 217.

Handset controller 211 is advantageously a microprocessor that coordinates the functions of personal communicator 113. Personal communicator 113 is preferably capable of receiving and placing telephone calls via antenna 209. It will be clear to those skilled in the art how to fabricate or purchase handset controller 211. ROM 219 advantageously holds the program instructions for handset controller 211. RAM 217 advantageously holds the number assignment module, which singularizes personal communicator 113. While it will be clear to those skilled in the art that RAM 217 can be any kind of read-writable memory, it is preferred that RAM 217 comprise non-volatile memory.

Integrated pager 207 advantageously is capable of receiving numeric or alphanumeric signals from a wide area (e.g., nationwide) commercial paging system (e.g., Metromedia Paging System) and for delivering those signals to handset controller 211 via one or more electro-magnetic antennas. It will be clear to those skilled in the art how to build integrated pager 207.

Microphone 213 is an electro-acoustic transducer for converting acoustic speech signals to electric signals for transmission by personal communicator 113 to cellsites 101. Speaker 215 is an electro-acoustic transducer for converting electric speech signals received from a cellular base station into acoustic speech signals.

Keypad 205 is advantageously capable of indicating to handset controller 211 that handset controller 211 and integrated pager 207 should be enabled to receive a number assignment module from antenna 111 (as shown in FIG. 1) and should store the received number assignment module into RAM 217. Keypad 205 is also advantageously capable of indicating to handset controller 211 that the reprogramming of personal communicator 113 with a successive number assignment module is to be precluded. It will be clear to those skilled in the art that personal communicator 113 (as shown in FIG. 1) can be enabled (or disabled) from being remotely programmed in a variety of ways (e.g., voice activation, password based activation, etc.).

Figure 3:
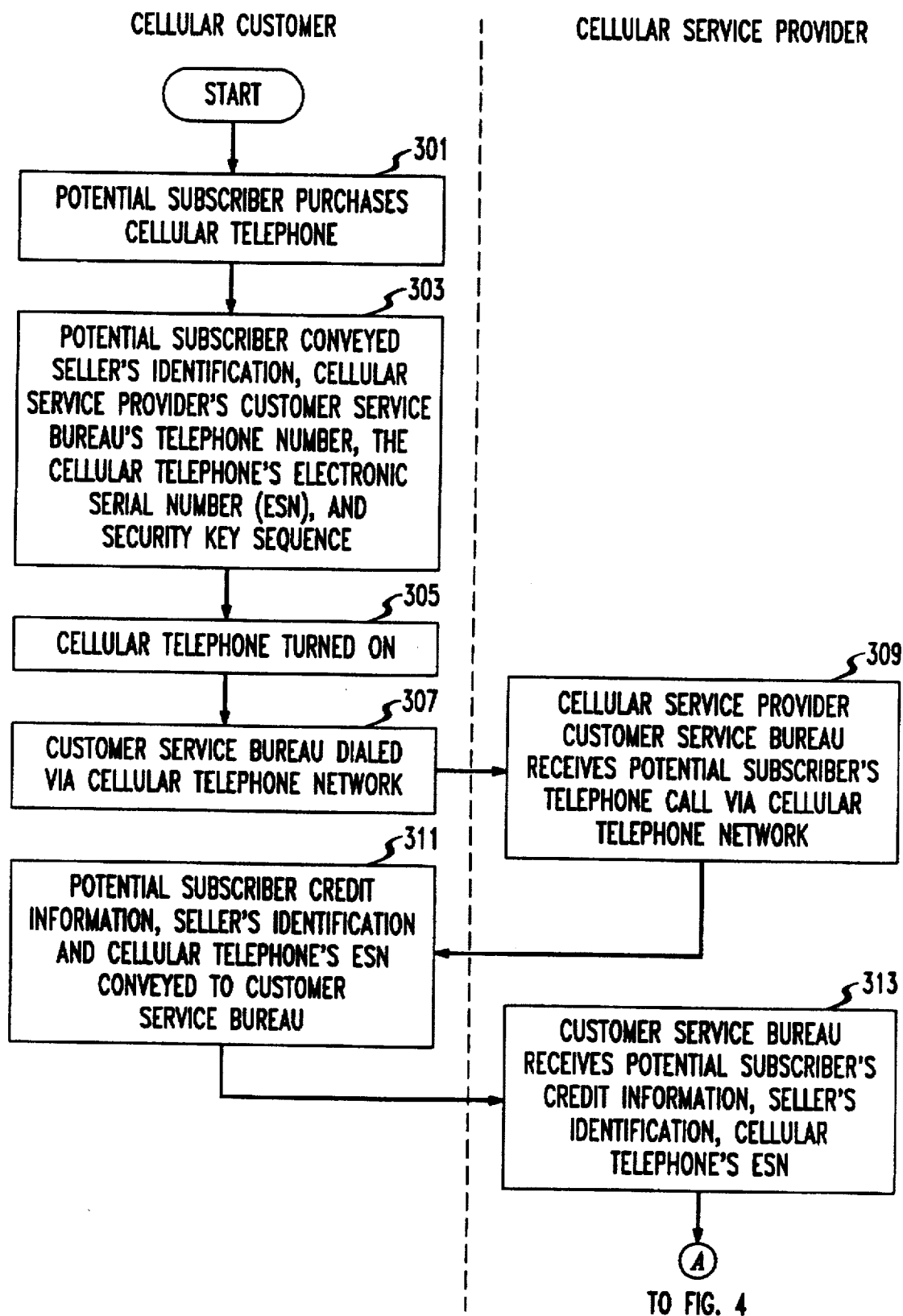
FIG. 3 shows a flow chart detailing the preferred method of operating the illustrative embodiment of the present invention.

FIG. 3 shows a flowchart detailing the preferred method of operating the illustrative embodiment shown in FIG. 1. As shown at 301 in FIG. 3, a potential subscriber advantageously initiates the process by purchasing a personal communicator and, at 303, by receiving from personal communicator 113 vendor information comprising the vendor's identification, service bureau's 107 telephone number, the electronic serial number of personal communicator 113 and a security key sequence. The security key sequence is advantageously used to encrypt the number assignment module during its transmission from service bureau 107 to personal communicator 113. Next, the potential subscriber turns personal communicator 113 on, as shown in 305, and advantageously calls service bureau 107, as shown at 307.

Figure 4:
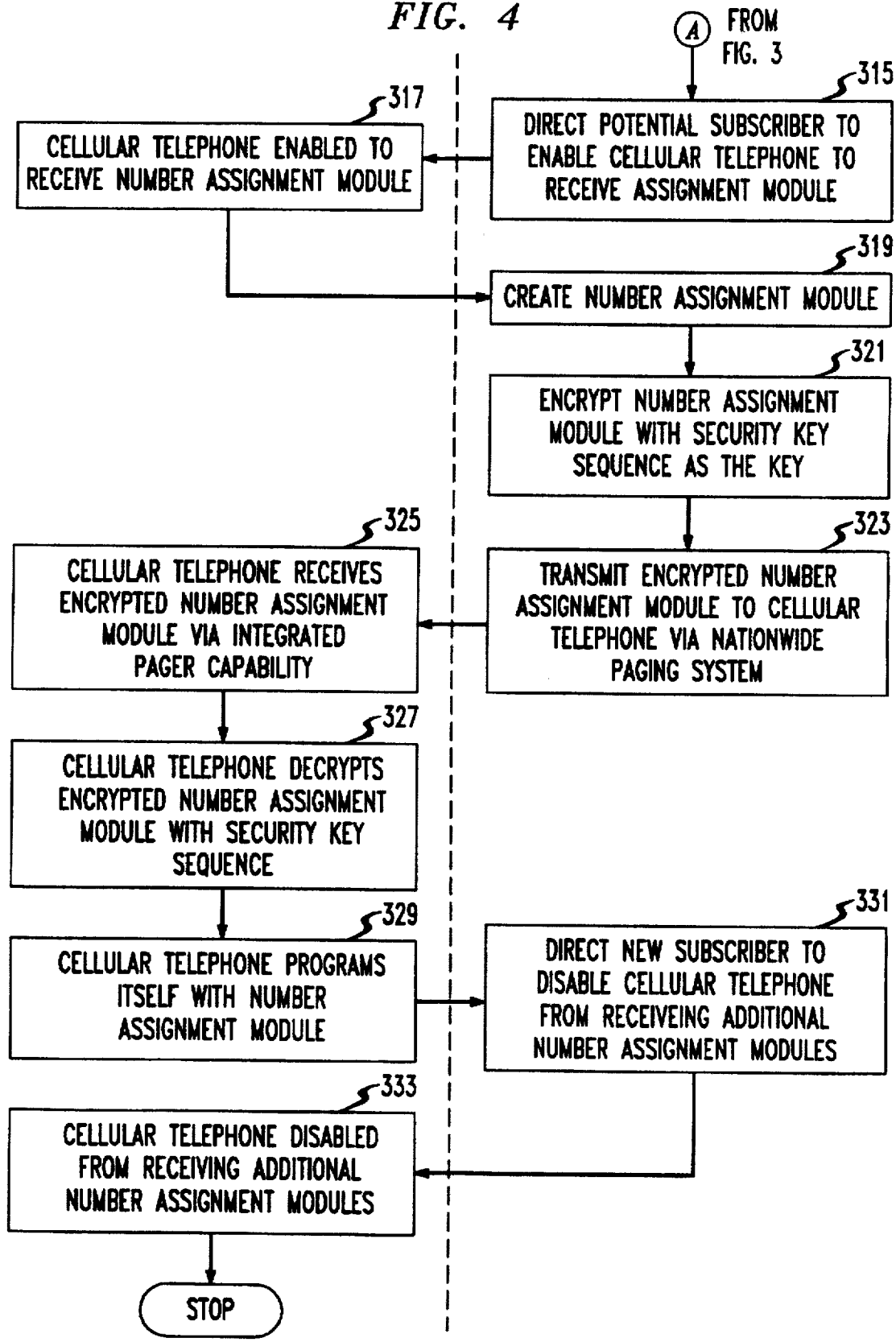
FIG. 4 shows a continuation of a flow chart detailing the preferred method of operating the illustrative embodiment of the present invention.

Service bureau 107 advantageously receives the potential subscriber's call, at 309, and receives, as shown at 313, information comprising the potential subscriber's credit information, the personal communicator's vendor's identification, and the personal communicator's electronic serial number ("ESN"). From the personal communicator's vendor's identification, service bureau 107 is preferably capable of decoding the security key sequence given to the potential subscriber by the personal communicator's vendor. Service bureau 107 advantageously instructs the potential subscriber to enable personal communicator 113 to receive a number assignment module, as shown at 315 in FIG. 4.

Service bureau 107 next advantageously creates the number assignment module, at 319, and encrypts the number assignment module with the security key sequence, at 321. The number assignment module is advantageously transmitted to personal communicator 113 via connection 109 and antenna 111, as shown at 323.

Personal communicator 113 advantageously receives the encrypted number assignment module via integrated pager 207 (shown in FIG. 2) capability, as shown in 325. Next, personal communicator 113 advantageously decrypts the encrypted number assignment module with the security key sequence, as shown at 327. As shown at 329, personal communicator 113 advantageously programs itself with the number assignment module. Next service bureau 107 advantageously directs the new subscriber to disable personal communicator 113 from receiving additional number assignment modules, as shown at 331. The new subscriber advantageously disables personal communicator 113 from receiving additional number assignment modules, as shown at 333.

We claim:

1. In a telephone network, a method for using a remotely transmitted number assignment module in a personal radio communicator in a system for remotely programming the personal radio communicator, the method comprising:

creating number assignment module (NAM) data for a personal radio communicator, using a customer service provider node in the telephone network;

controlling a cellular radio telephone cellsite system, using a mobile telephone switching office node in the telephone network, the switching office node including control and switching elements;

establishing a cellular radio telephone communications path between said personal radio communicator and a first antenna of said cellular radio telephone cellsite system;

transmitting said number assignment module (NAM) data to said personal radio communicator, using a second antenna of a wide area radio paging system connected to said customer service provider node, said wide area radio paging system being separate from said cellular radio telephone cellsite system;

said number assignment module (NAM) data enabling said personal radio communicator to communicate over said communications path with said cellular radio telephone cellsite system via said first antenna;

providing said personal radio communicator with an unprogrammed memory element for receiving said number assignment module data;

receiving said number assignment module data in a receiving portion of said personal radio communicator from said second antenna that is part of said wide-area radio paging system;

initially programming said number assignment module data into said memory element of said personal radio communicator; and using said number assignment module data in communications between said personal radio communicator and the cellsite in said cellular radio telephone cellsite system.

2. The method of claim 1 further comprising the steps of:

enabling said personal radio communicator to receive said number assignment module data; and disabling said personal communicator from receiving additional number assignment modules.

3. The method of claim 1 further comprising the step of decrypting said number assignment module data with a security key sequence as a key.

4. In a telephone network, a personal radio communicator and a system for remotely programming the personal radio communicator, comprising:

a customer service provider node in the telephone network, for creating number assignment module (NAM) data for a personal radio communicator;

a mobile telephone switching office node in the telephone network, including control and switching elements for controlling a cellular telephone cellsite system;

a cellular radio telephone cellsite system connected to the mobile telephone switching office node; including a first radio antenna to establish and maintain a cellular radio telephone communications path with said personal radio communicator;

a wide area radio paging system connected to the customer service provider node, including a second radio antenna separate from said cellular radio telephone cellsite system;

said customer service provider node transmitting said number assignment module (NAM) data to said personal radio communicator, using said second radio antenna of said wide area radio paging system;

said number assignment module (NAM) data enabling said personal radio communicator to communicate over said communications path with said cellular radio telephone cellsite system via said first radio antenna;

an electro-magnetic antenna in said personal radio communicator configured to receive signals from said wide-area radio paging system;

a receiver in said personal communicator for receiving a number assignment module from the electromagnetic antenna and for delivering the number assignment module to a controller in said personal radio communicator;

an unprogrammed memory element in said personal radio communicator for storing said number assignment module; and said controller for accepting said number assignment module from said receiver and initially programming said number assignment module into said memory element, said controller retrieving the number assignment module from said memory element for use in communication with said cellular radio telephone cellsite system.

5. The telephone network of claim 4, wherein the personal radio communicator further comprising:

a transceiver communicating with said electromagnetic antenna for transmitting and receiving speech signals via said electromagnetic antenna;

a first electro-acoustic transducer connected to said transceiver for converting a first acoustic speech signal into a first electrical signal; and a second electro-acoustic transducer connected to said transceiver for converting a second electrical signal into a second acoustic signal.

6. The telephone network of claim 5, wherein the personal radio communicator further comprising a keypad connected to said transceiver for enabling said personal radio communicator to receive said number assignment module.

7. The telephone network of claim 4, wherein the personal communicator wherein said receiver, in the personal radio communicator comprises a pager.

8. In a telephone network, a method for creating a number assignment module and for transmitting said number assignment module to a personal radio communicator in a system for remotely programming the personal radio communicator, said method comprising:

creating number assignment module (NAM) data for a personal radio communicator, using a customer service provider node in the telephone network;

controlling a cellular radio telephone cellsite system, using a mobile telephone switching office node in the telephone network; the switching office node including control and switching elements;

establishing a cellular radio telephone communications path between said personal radio communicator and a first antenna of said cellular radio telephone cellsite system;

transmitting said number assignment module (NAM) data to said personal radio communicator, using a second antenna of a wide area radio paging system connected to said customer service provider node, said wide area radio paging system being separate from said cellular radio telephone cellsite system;

said number assignment module (NAM) dam enabling said personal radio communicator to communicate over said communications path with said cellular radio telephone cellsite system via said first antenna;

receiving a request from said personal radio communicator via the cellsite in said cellular radio telephone cellsite system to create said number assignment module data for initially programming the personal radio communicator, the personal radio communicator including an antenna for receiving signals from said wide-area radio paging system;

creating said number assignment module data upon receiving said request from the personal radio communicator; and transmitting said number assignment module data to said personal radio communicator via said second antenna of said wide-area radio paging system.

9. The method of claim 8 further comprising the step of encrypting said number assignment module data with a security data sequence as a key prior to transmitting the number assignment module data to the personal radio communicator.

10. In a telephone network, a method of using a personal radio communicator in a system for remotely programming the personal radio communicator, comprising:

creating number assignment module (NAM) data for a personal radio communicator, using a customer service provider node in the telephone network;

controlling a cellular telephone cellsite system, using a mobile telephone switching office node in the telephone network: the switching office node including control and switching elements;

establishing a cellular radio telephone communications path between said personal radio communicator and a first antenna of said cellular radio telephone cellsite system;

transmitting said number assignment module (NAM) data to said personal radio communicator, using a second antenna of a wide area radio paging system connected to said customer service provider node, said wide area paging system being separate from said cellular radio telephone cellsite system;

said number assignment module (NAM) data enabling said personal radio communicator to communicate over said communications path with said cellular radio telephone cellsite system via said first antenna;

receiving a number assignment module via a receiver and electro-magnetic antenna in the personal radio communicator that is configured to receive an electro-magnetic signal from said wide-area radio paging system;

initially programming the personal radio communicator by storing said number assignment module in memory; and retrieving at least a portion of said number assignment module to enable communication with the cellsite in said cellular radio telephone cellsite system.

11. In a telephone network, a system for remotely programming a personal radio communicator, comprising:

a customer service provider node in the telephone network, for creating number assignment module (NAM) data for a personal radio communicator;

a mobile telephone switching office node in the telephone network, including control and switching elements for controlling a cellular telephone cellsite system;

a cellular radio telephone cellsite system connected to the mobile telephone switching office node, including a first radio antenna to establish and maintain a cellular radio telephone communications path with said personal radio communicator;

a wide area radio paging system connected to the customer service provider node, including a second radio antenna separate from said cellular radio telephone cellsite system;

said customer service provider node transmitting said number assignment module (NAM) data to said personal radio communicator, using said second radio antenna of said wide area radio paging system;

said number assignment module (NAM) data enabling said personal radio communicator to communicate over said communications path with said cellular radio telephone cellsite system via said first radio antenna.

12. In a telephone network, a method for remotely programming a personal radio communicator, comprising:

creating number assignment module (NAM) data for a personal radio communicator, using a customer service provider node in the telephone network;

controlling a cellular radio telephone cellsite system, using a mobile telephone switching office node in the telephone network, the switching office node including control and switching elements;

establishing a cellular radio telephone communications path between said personal radio communicator and a first antenna of said cellular radio telephone cellsite system;

transmitting said number assignment module (NAM) data to said personal radio communicator, using a second antenna of a wide area radio paging system connected to said customer service provider node, said wide area radio paging system being separate from said cellular radio telephone cellsite system;

said number assignment module (NAM) data enabling said personal radio communicator to communicate over said communications path with said cellular radio telephone cellsite system via said first antenna.

\* \* \* \* \*